(12) United States Patent
Hödlmoser et al.

(10) Patent No.: US 12,406,523 B2
(45) Date of Patent: Sep. 2, 2025

(54) COMPUTER-IMPLEMENTED METHOD FOR ANALYSING THE INTERIOR OF A VEHICLE

(71) Applicant: emotion3D GmbH, Vienna (AT)

(72) Inventors: Michael Hödlmoser, Schörfling (AT); Sebastian Beyer, Vienna (AT); Florian Seitner, Vienna (AT)

(73) Assignee: emotion3D GmbH, Vienna (AT)

( * ) Notice: Subject to any disclaimer, the term of this patent is extended or adjusted under 35 U.S.C. 154(b) by 288 days.

(21) Appl. No.: 18/021,575

(22) PCT Filed: Jul. 14, 2021

(86) PCT No.: PCT/EP2021/069627
§ 371 (c)(1),
(2) Date: Feb. 16, 2023

(87) PCT Pub. No.: WO2022/037853
PCT Pub. Date: Feb. 24, 2022

(65) Prior Publication Data
US 2023/0316783 A1    Oct. 5, 2023

(30) Foreign Application Priority Data
Aug. 18, 2020 (AT) .................................. 50693/2020

(51) Int. Cl.
*G06V 40/10* (2022.01)
*B60N 2/02* (2006.01)
(Continued)

(52) U.S. Cl.
CPC ............. *G06V 40/103* (2022.01); *B60N 2/02* (2013.01); *B60W 50/14* (2013.01); *G06T 7/73* (2017.01);
(Continued)

(58) Field of Classification Search
CPC .. G06V 40/103; G06V 40/172; G06V 20/593; G06T 7/73; G06T 2207/30196;
(Continued)

(56) References Cited

U.S. PATENT DOCUMENTS 5,983,147 A      11/1999  Krumm
8,599,266 B2 *  12/2013  Trivedi .................. G06T 7/292
                                                            348/169
(Continued)

FOREIGN PATENT DOCUMENTS

CN    110422178         11/2019
CN    110422178 A   *  11/2019   ............ B60W 50/00
(Continued)

OTHER PUBLICATIONS

Internationaler Recherchenbericht und Schriftlicher Bescheid [International Search Report and the Written Opinion] Dated Nov. 12, 2021 From the International Searching Authority Re. Application No. PCT/EP2021/069627 and Its Translation of Search Report Into English. (13 Pages).

*Primary Examiner* — Shaghayegh Azima

(57) ABSTRACT

The invention relates to a computer-implemented method for determining features of the interior (1) of a vehicle (2) with at least one image capturing unit (3), a data processing unit (4) and a database (5), comprising the capturing, by the image capturing unit (3), of a photo (11) or video of the interior (1) and transmission to the data processing unit (4), the analysis of the photo (11) or video in the data processing unit (4) by a sequential data processing chain (10) of program modules (12, 12', 12"), comprising the steps of rough analysis for the localisation of persons and objects and generation of body and object images (15, 15', 15"), detailed analysis of the body and object images (15, 15', 15"), extraction of body and object data (7), and storage, by the
(Continued)

data processing unit (4), of the determined body and object data (7) in a hierarchical data model (9) in the database (5).

12 Claims, 7 Drawing Sheets

(51) Int. Cl.
*B60W 50/14* (2020.01)
*G06T 7/73* (2017.01)
*G06V 20/59* (2022.01)
*G06V 20/64* (2022.01)
*G06V 40/16* (2022.01)

(52) U.S. Cl.
CPC ............ *G06V 20/593* (2022.01); *G06V 20/64* (2022.01); *G06V 40/172* (2022.01); *B60W 2050/146* (2013.01); *G06T 2207/30196* (2013.01); *G06T 2207/30242* (2013.01); *G06T 2207/30268* (2013.01)

(58) Field of Classification Search
CPC ........... G06T 2207/30242; G06T 2207/30268; B60W 50/14; B60W 2050/146; B60N 2/02
See application file for complete search history.

(56) References Cited

U.S. PATENT DOCUMENTS

| | | | |
|---|---|---|---|
| 10,115,164 B1* | 10/2018 | Binion | G06Q 40/08 |
| 11,250,425 B1* | 2/2022 | Jaffe | G06Q 20/389 |
| 11,417,122 B2* | 8/2022 | Park | G06V 20/59 |
| 2006/0187305 A1* | 8/2006 | Trivedi | G06T 3/047 348/169 |
| 2010/0332715 A1* | 12/2010 | Hadden | G05B 19/0428 710/310 |
| 2015/0294419 A1* | 10/2015 | Gonzalez Miranda | G06F 3/04842 701/31.6 |
| 2016/0239714 A1* | 8/2016 | Oami | G06V 20/59 |
| 2018/0326992 A1* | 11/2018 | Aoi | B60W 50/08 |
| 2019/0258879 A1 | 8/2019 | Vachhani | |
| 2020/0320866 A1* | 10/2020 | Lewis | G08G 1/0112 |
| 2021/0406570 A1* | 12/2021 | Bielby | G06F 18/254 |
| 2022/0084019 A1* | 3/2022 | Jaffe | G06Q 20/389 |
| 2022/0084131 A1* | 3/2022 | Binion | B60W 50/14 |

FOREIGN PATENT DOCUMENTS

| | | |
|---|---|---|
| CN | 111086370 | 5/2020 |
| DE | 19719695 | 11/1998 |
| DE | 10234824 | 2/2004 |
| DE | 102008028844 | 1/2009 |
| DE | 102010002861 | 9/2011 |
| DE | 102013220240 | 4/2015 |
| DE | 102016225406 | 6/2018 |
| DE | 102017211885 | 1/2019 |
| EP | 1700761 | 9/2006 |
| EP | 2813408 | 12/2014 |
| FR | 2815135 | 4/2002 |
| KR | 10-2020-0044515 | 4/2020 |
| WO | WO 2016/144631 | 9/2016 |
| WO | WO 2018/057422 | 3/2018 |

* cited by examiner

```
"persons": [
    {"name":"driver",
        "attentionZone": {
            "name": ""},
        "eyes": {
            "eyeAnalysis": [
                {   "openness": 0.3958454430103302,
                    "phi": 0.5148861408233643,
                    "std": 7.933961868286133, },
                {   "openness": 0.20173624157905579,
                    "phi": 0.1867310106754303,
                    "std": 13.637995719909668, } ],
            "eyeGaze": [
                {   "phi_yaw": 0.5148861408233643,
                    "std": 7.933961868286133,
                    "theta_pitch": -0.25254929065704346 },
                {   "phi_yaw": 0.1867310106754303,
                    "std": 13.637995719909668,
                    "theta_pitch": 0.2086169719696045 } ], },
        "headPose": {
            "ccsPitchDegree": 24.613218526763536,
            "ccsRollDegree": -15.066894513319754,
            "ccsYawDegree": 39.91502651886198,
            "confidence": 0.9391198006780514,},
        "pose": {
            "extendedROI": {
                "height": 1163,
                "width": 872,
                "x": 754,
                "y": -81 },
            "jointModel": "WHOLEBODYSPINE",
            "keypoints": [
                {"confidence": 0.7060027122497559,
                    "keypoint": {
                        "x": 1064.93212890625,
                        "y": 410.23406982421875},
                    "type": "NOSE" },
                {"confidence": 0.7212557196617126,
                    "keypoint": {
                        "x": 1135.5242919921875,
                        "y": 340.74432373046875},
                    "type": "EYE_LEFT" },
                {"confidence": 0.7064432501792908,
                    "keypoint": {
                        "x": 1050.430908203125,
                        "y": 338.9989929199219},
                    "type": "EYE_RIGHT" },
                {"confidence": 0.4470450282096863,
                    "keypoint": {
                        "x": 1513.98583984375,
                        "y": 460.3958740234375},
                    "type": "SHOULDER_LEFT"},
                {"confidence": 0.3997925817966461,
                    "keypoint": {
                        "x": 1009.6524658203125,
                        "y": 455.14862060546875},
                    "type": "SHOULDER_RIGHT"}, } }, },
                .....
    {"name":"co-driver",
        "attentionZone": {
            "name": ""},},
        ..... ]
```

Fig. 3c

COMPUTER-IMPLEMENTED METHOD FOR ANALYSING THE INTERIOR OF A VEHICLE

RELATED APPLICATIONS

This application is a National Phase of PCT Patent Application No. PCT/EP2021/069627 having International filing date of Jul. 14, 2021, which claims the benefit of priority of Austria Patent Application No. A 50693/2020 filed on Aug. 18, 2020. The contents of the above applications are all incorporated by reference as if fully set forth herein in their entirety.

FIELD AND BACKGROUND OF THE INVENTION

The invention relates to a computer-implemented method for analysing the interior of a vehicle.

Modern vehicles include camera-based systems for analysing their interior in order to detect or analyse persons and objects located in the vehicle cabin. The arrangement of persons and objects in the interior of the vehicle is thereby referred to as a scene. With the help of such systems, both safety-relevant information (e.g. driver attention, seat belt recognition for all occupants, etc.) as well as non-safety-relevant information (e.g. determination of the driver's size for automatic seat adjustment, driver identification for modelling different adjustment profiles, etc.) may be derived from the captured scene.

However, known systems have various drawbacks. Firstly, different tasks from the interior analysis field are usually examined independently of each other. That is, for each piece of information to be derived, a completely independently operating image processing module is used. For example, there are systems that model the driver's attention level, or recognise and verify persons based on their face. Such systems have the disadvantage that the individual modules require a lot of memory and computing capacity.

Secondly, the scenes to be identified are of different sizes for different types of vehicles (e.g. car, truck, bus ("people mover"), train, etc.) and thus also of different complexity. When analysing persons and objects, for example, the number of objects to be analysed in the interior of a train is much larger than in the interior of a car. Thus, different systems need to be provided for different types of vehicles.

SUMMARY OF THE INVENTION

According to the invention, these and other objects of the invention are solved by a method according to claim 1.

A computer-implemented method according to the invention for determining features of the interior of a vehicle uses at least one image capturing unit arranged in the interior of the vehicle, a data processing unit and a database. The method comprises at least the following steps:

First, the image capturing unit takes a photo or a video of the interior and transmits the photo or video to the data processing unit. The data processing unit analyses the photo or video through a sequential data processing chain of hierarchically arranged program modules.

A data processing chain according to the invention comprises several program modules, wherein each module either extracts information from images using known image processing algorithms, or combines and further processes information from other modules to obtain higher quality information. The extracted information is used to describe the scene and may include, for example, the position of a person or object or the colours, sizes, perimeters, etc. of these localised persons and objects. The information obtained may be substantially summarised as person and object data.

The program modules of the data processing chain are arranged hierarchically, the hierarchical level of a module being determined from the level of detail of the information obtained therefrom.

The modules may be dependent on one or more other modules. The first module in the processing chain is at the top of the hierarchy and has no dependencies on information from other modules. The lower the module is in the hierarchy, the more dependencies there are on preceding processing steps or modules. The information extracted by the modules thus gains in detail as the hierarchy tier is reduced.

The first step is a coarse analysis to localise persons and objects in the photo or video. Known image processing algorithms may be used for this purpose. The outlines of the recognised persons or object are detected in the photo or video and partial sections of the photo or video are generated around these outlines in the form of body and object images. The objects may be, for example, mobile phones, child seats, handbags, backpacks or other objects.

Optionally, the data processing unit may store the determined body and object data in a hierarchical data model in the database.

The next step is a detailed analysis of the extracted body and object images. Known image processing algorithms may be used for this purpose. Body data such as body height, age, weight, sex, a body joint model, the body posture and other visually recognisable characteristics of the bodies can be extracted. Likewise, object data such as size, shape, colour, perimeter and other visually recognisable characteristics of the detected objects can be extracted. The detailed analysis may be carried out for all persons and objects localised in the interior of the vehicle in the first step.

In a next step, the data processing unit stores the determined body and object data in a hierarchical data model in the database. In this hierarchical data model, the data from the rough analysis is arranged in a higher hierarchical level than the data from the detailed analysis.

The hierarchical data model may be implemented as a hierarchically structured text file that can be stored in the database and optionally modified by the data processing unit. For example, it may be a file in XML format or a proprietary file format. This ensures the compatibility of the data model with any external program modules.

This hierarchical data model remains in the database and may subsequently be used by program modules of the data processing unit itself, or by external program modules, for example from an external data processing unit, to determine features of the interior of the vehicle.

An external program module may refer to the hierarchical data model to determine a specific feature of the interior of the vehicle. The interior feature of interest may be, for example, one or more of the following: occupancy of the vehicle, seat belts correctly fastened, position of objects such as mobile phones or child seats relative to the detected persons, level of attention of the driver, driver fatigue, and the like.

The external program module may extract from the hierarchical data model exactly those body and object data that are required to determine the feature. This allows the external program module to combine information from different tiers and different levels of detail without having to run the corresponding analysis models again, so that fast processing is possible.

In the data processing chain according to the invention, the program modules for rough analysis and detailed analysis are thus structured hierarchically. The hierarchy in the processing results from the number of preceding program modules that are necessary to compute the information with as minimal use of resources as possible.

According to the invention, image processing modules and algorithms are combined in a hierarchical manner. This offers significant advantages over conventional methods. There is a considerable reduction in memory and computing capacity. A system that uses the method according to the invention may detect and process a variety of states and information from a scene more swiftly. Information that is higher up in the hierarchy tier (i.e. has a lower level of detail) is usually required by several program modules and is computed first using larger portions of resources (i.e. memory and processor power).

Information that is lower down in the hierarchy tier (i.e. that has a higher level of detail) is only computed downstream, using fewer resources and also in parallel. Accordingly, a method according to the invention allows the use of less expensive hardware for the corresponding systems.

The method according to the invention also allows a standardisation of the overall system for interior analysis. This way, characteristics of the interior of any complex overall system may be determined without having to change the data processing chain. The data processing chain thus has a high scalability in terms of size and complexity of the scenes of the interior. However, hierarchy tiers may also be linked to certain characteristics and requirements. For example, with a lower level of detail of the overall system (i.e. only information with a low level of detail is extracted and required), the number of cameras and the resolution of the input data may be reduced, but also available program modules may be restricted to certain hierarchy tiers.

The data processing unit and the database may preferably be located entirely in a vehicle.

However, it may also be provided that the data processing unit and the database are arranged in the vehicle and communicate via an interface, for example a wireless connection, with an external server, for example a server on the Internet, on which there may optionally be a database with a pre-stored data model.

The image capturing unit may be a photo or video camera, a ToF (Time-of-Flight) camera or the like. The use of a ToF camera facilitates the robust localisation of person and objects and the extraction of body and object data. The image capturing unit may preferably be arranged in the vehicle in such a way that as much of the interior as possible is visible in the image area. For this purpose, the image capturing unit may also comprise several cameras arranged at different angles. Image analysis libraries and/or a detector trained with training examples, for example a neural network, may be used to extract and analyse the body and object data.

The data processing unit may be designed as a microcontroller or microcomputer and comprise a central processing unit (CPU), a volatile semiconductor memory (RAM), a non-volatile semiconductor memory (ROM, SSD hard drive), a magnetic memory (hard drive) and/or an optical memory (CD-ROM) as well as interface units (Ethernet, USB) and the like. The components of such data processing units are generally known to those skilled in the art. The database may be provided as a software module in the data processing unit, in a computer separate from the data processing unit or in an external server.

According to the invention, it may be provided that the data processing unit is connected to actuators or warning units, for example a motor for adjusting the seat positions of the vehicle, a warning light for indicating a warning when the seat belt is not fastened, or a graphical display for indicating the detected level of attention of the driver. These actuators or warning units may preferably be controlled directly by the external program modules in response to the detected features of the vehicle interior.

The invention further extends to a computer-readable storage medium comprising instructions which cause a data processing unit to execute a method according to the invention.

Furthermore, the invention also extends to a device for determining features of the interior of a vehicle, comprising at least an image capturing unit, a data processing unit and a database, wherein the device is designed for executing a method according to the invention.

BRIEF DESCRIPTION OF THE SEVERAL VIEWS OF THE DRAWINGS

Further features according to the invention result from the claims, the exemplary embodiments and the figures.

In the following, the invention is explained on the basis of a non-limiting exemplary embodiment.

FIGS. 3a-3c show schematic views of embodiments of a hierarchical data model according to the invention, a data processing chain according to the invention and a text file according to the invention for storing the data model;

DESCRIPTION OF SPECIFIC EMBODIMENTS OF THE INVENTION

Figure 1:
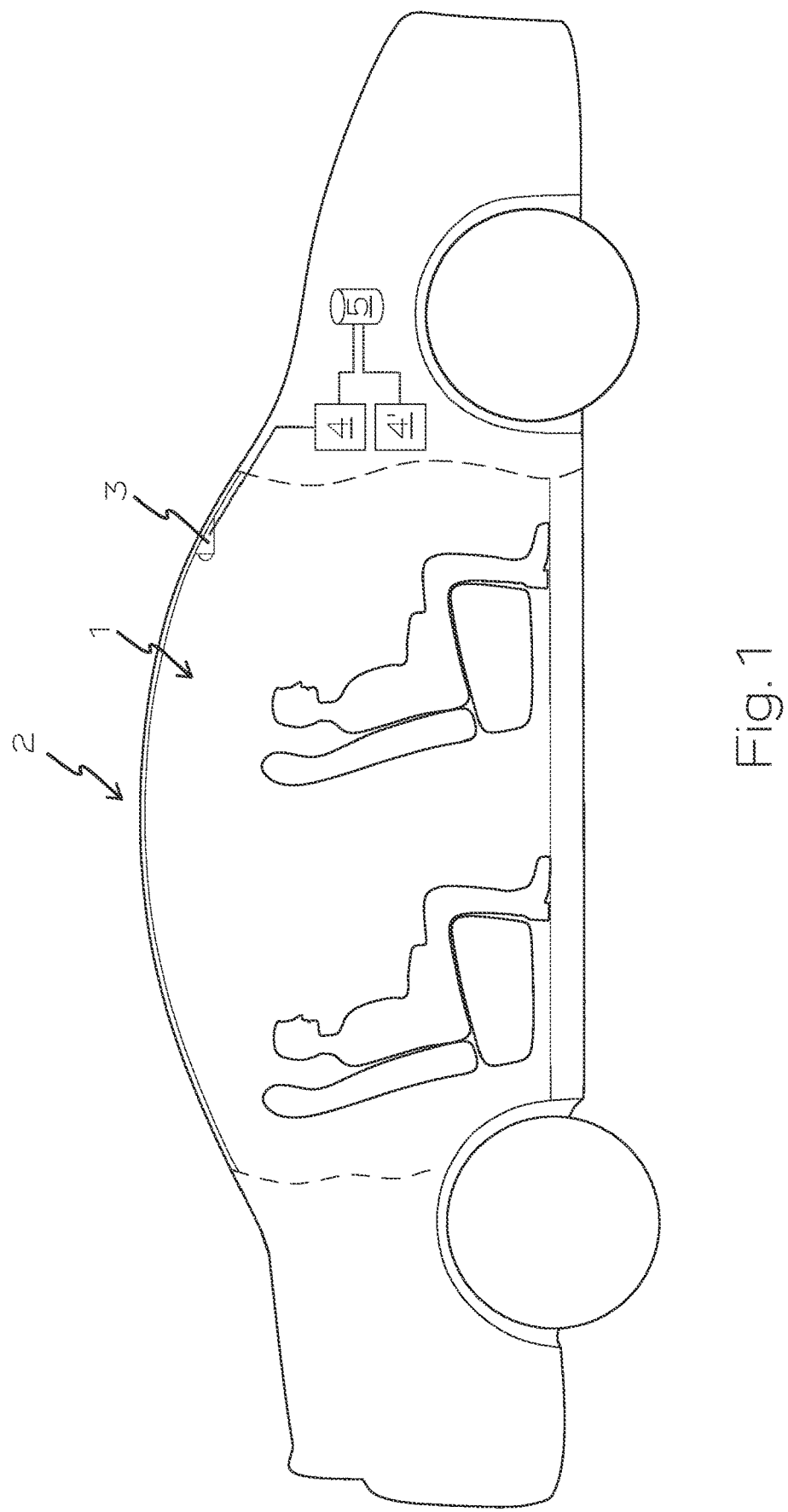
FIG. 1 shows a schematic view of a vehicle with a data processing unit for carrying out a method according to the invention.

FIG. 1 shows a schematic view of a vehicle 2 with electronic data processing units 4, 4' integrated therein for carrying out a method according to the invention. In the interior 1 of the vehicle 2, an image capture unit 3 in the form of a camera is arranged on the ceiling. The camera is designed for this purpose and is arranged in such a way that it can capture the entire interior 1 of the vehicle 2, in particular all seats and persons located therein.

In the interior of the vehicle, several persons sit in two rows. In this embodiment, the vehicle is designed as a passenger car. The data processing units 4, 4' are connected to a database 5 and have interfaces (not shown) for communication with external electronic components.

Figure 2A:
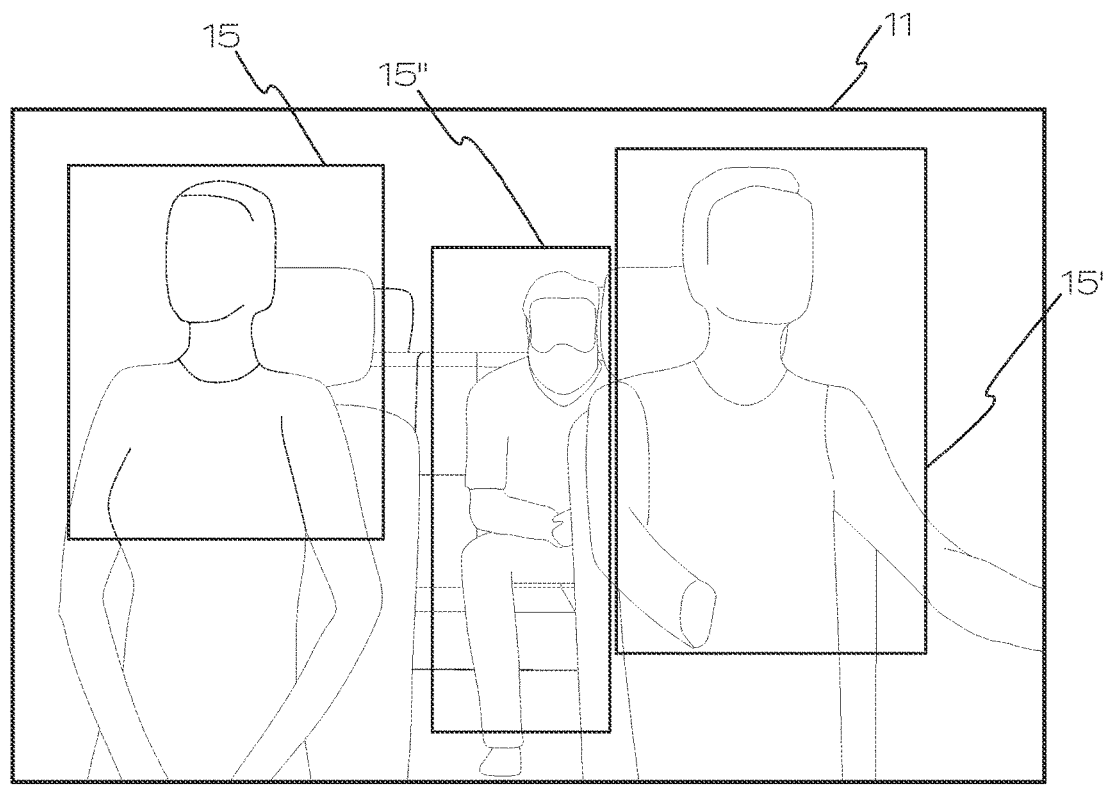
FIGS. 2a-2c show schematic examples of a captured image and the information extracted therefrom.
Figure 2B:
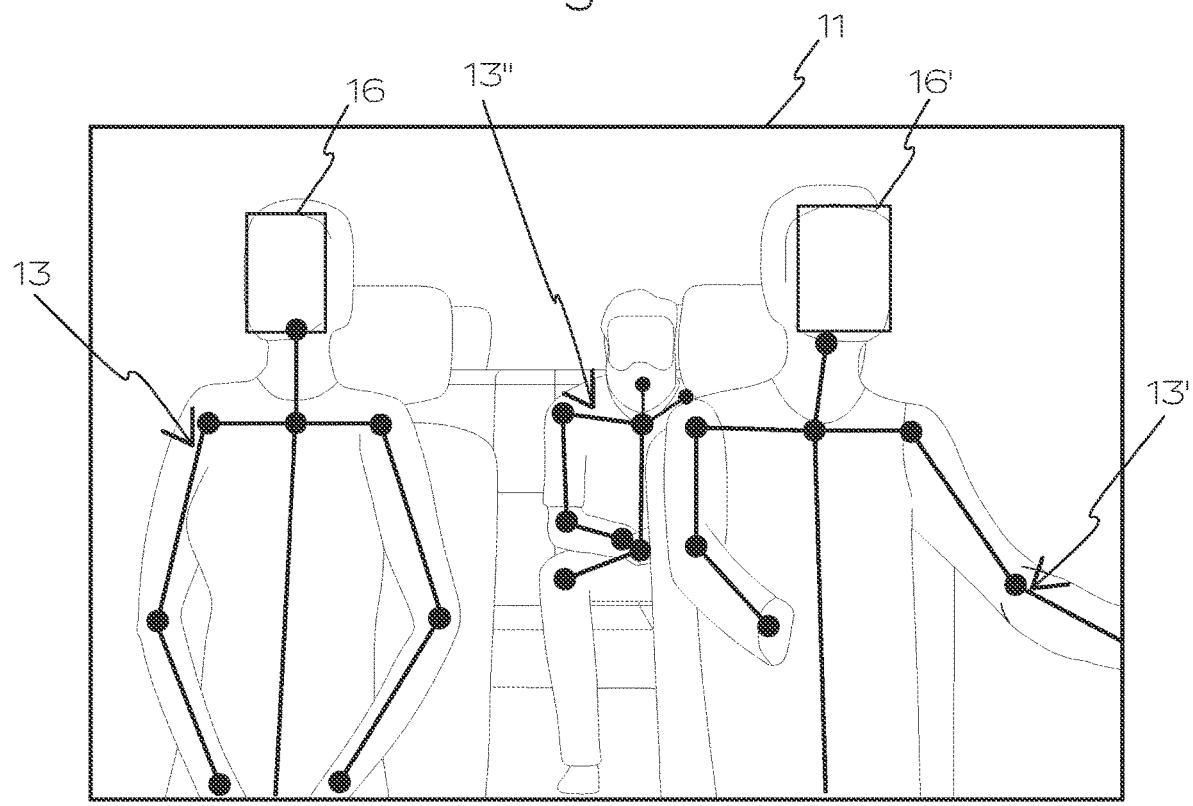
Figure 2C:
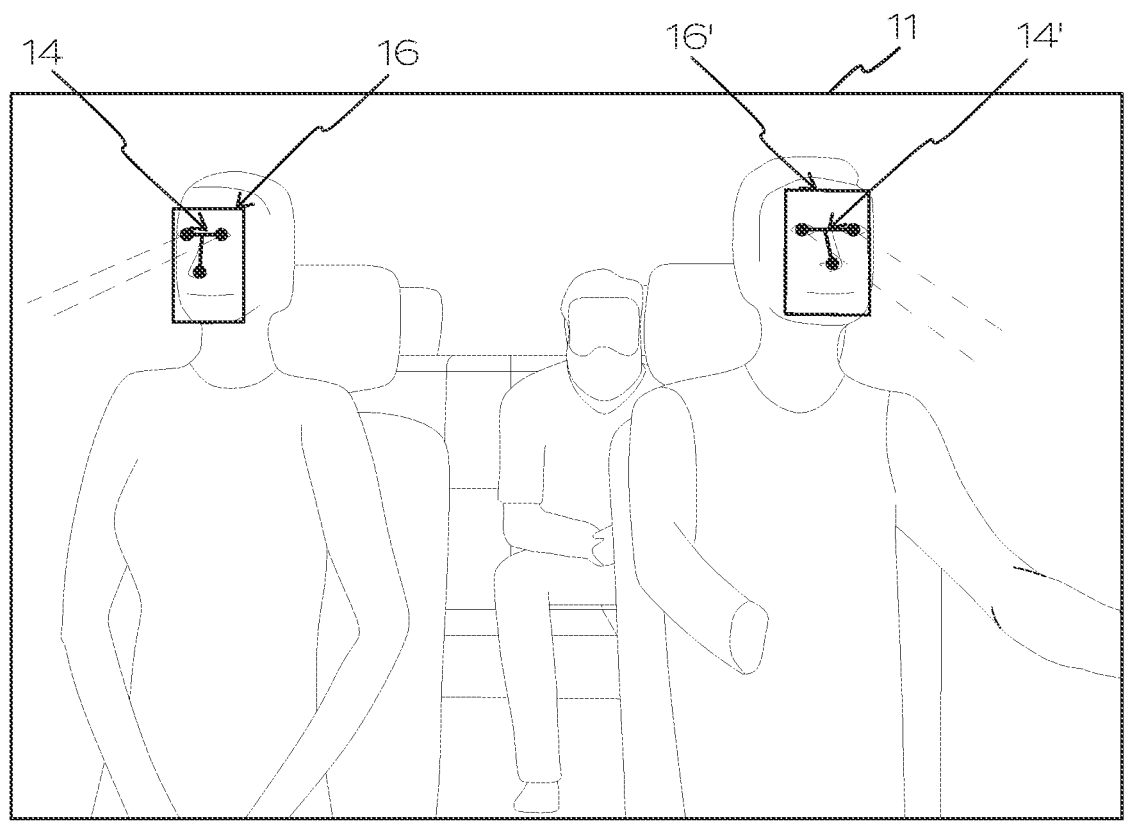

FIGS. 2a-2c show schematic examples of a photo 11 of the interior 1 taken by the image capturing unit 3 and transmitted to the data processing unit 4. Photo 11 shows a typical scene in the interior 1 of a vehicle 2 with a driver, a passenger and a person sitting in the back seat.

The extraction of the information contained in the scene is done by a hierarchical data processing chain 10. In the course of the rough analysis, persons and objects are localised and optionally overlapping body and object images 15, 15', 15" are generated. In the present exemplary embodiment, three persons and no objects are localised. Based on the localised persons and their coordinates, the photo 11 is divided into three body and object images 15, 15', 15" and these are passed on to the subsequent detailed analysis.

During the detailed analysis, a more detailed analysis of the body images 15, 15', 15" and an extraction of body and object data 7 is performed. The extracted body and object data 7 is in particular a body joint model 13, 13', 13" from which a variety of relevant information may be derived. For example, based on a body joint model 13, 13', 13", the sitting posture of the person may be detected and, by comparison with reference images, the correct use of a seat belt may be detected. The body joint models 13, 13', 13" may in particular be formed in the form of graphs, i.e. points in Cartesian space connected by edges.

The weight, age, sex and girth of the persons may also be determined from this, for example by comparison with reference data stored in the database 5.

At the hierarchy tier of the detailed analysis, a distinction may also be made as to which of the three body and object images 15, 15', 15" are to be analysed further, namely preferably those of the driver and the passenger.

In embodiments of the invention, more finely structured face images 16, 16' and personal data 6 of the driver and passenger may also be extracted and transferred to the subsequent program module of the data processing chain 10. In the exemplary embodiment according to FIG. 2c, the detected faces are the faces of the driver and the passenger. By applying image recognition algorithms of the data processing unit 4, face models 14, 14' may be created. The face images 16, 16' may be used to determine facial data 8 such as the positions of the mouth, nose, eyes and ears, the direction of gaze and the like of the two persons. The face models 14, 14' may in particular be formed in the form of graphs, i.e. points in Cartesian space connected by edges.

As a result of the hierarchical data processing chain 10, at least the body and object data 7 are stored in the database 5. A storage of the taken photo 11 or the body images 15, 15', 15" in the database may be provided, but is not mandatory and may be omitted to save storage space.

Figure 3A:
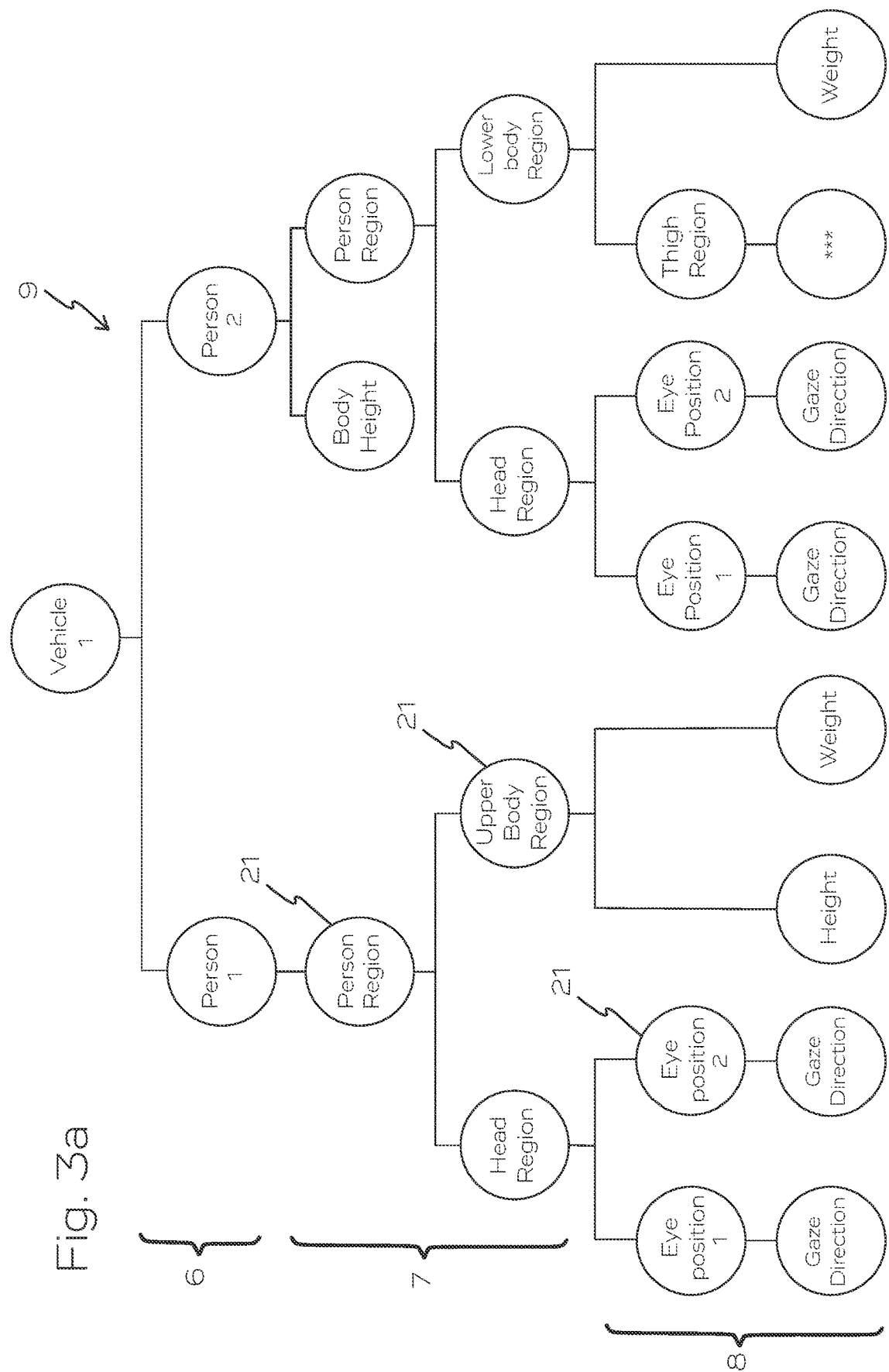

FIG. 3a shows a schematic view of a hierarchical data model 9 created by the data processing unit 4 with a plurality of hierarchically arranged data objects 21. The level of detail of the information stored in the data objects 21 increases from top to bottom. In this representation, each data object 21 is shown as a circle, and the data objects 21 are divided into personal data 6, body and object data 7, and facial data 8. Detected persons are described at the level of personal data 6 by a variety of characteristics. Depending on the level of detail, the characteristics are stored in different tiers. Related characteristics are connected with characteristics or objects from tiers below or above.

For example, a vehicle may contain two persons, each person may have a weight, height and girth. On the tier of body and object data 7, different body regions such as upper body, lower body, head may be distinguished.

On the tier of facial data 8, positions of eyes, nose, mouth, ears etc. of each person or selected persons may be stored. Of course, further hierarchical tiers may also be provided, i.e. a finer subdivision of the scene shown in photo 11 may also be made. For example, a further subdivision into related groups of persons could be made, such as in a bus, where each row of persons may form its own hierarchical tier as a group of persons.

Figure 3B:
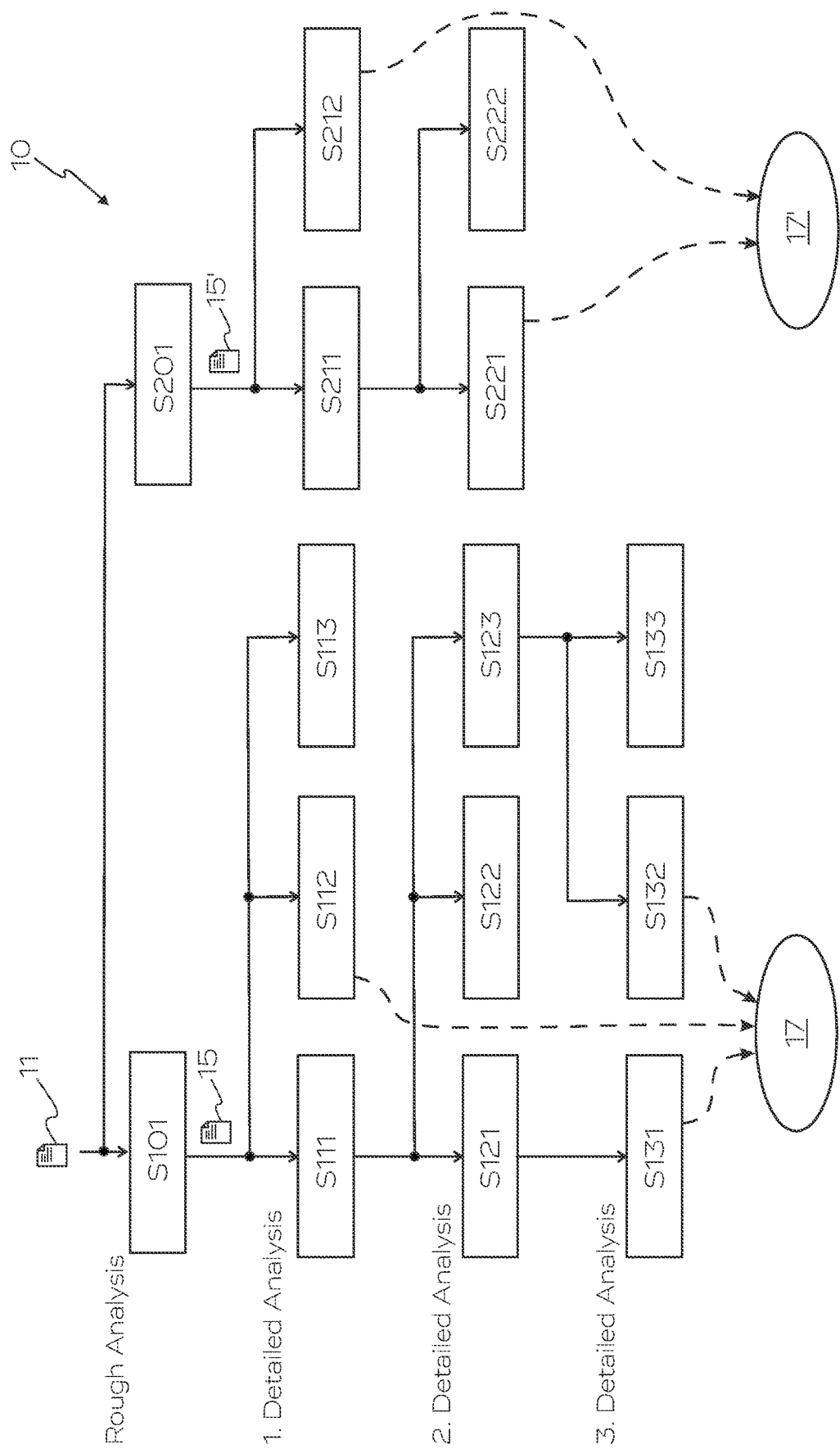

FIG. 3b shows a schematic representation of a data processing chain 10 according to the invention, divided into a rough analysis and a subsequent first, second and third detailed analysis. The data processing chain is provided with a photo 11 and analyses it in parallel for persons (left branch) and objects (right branch). Rectangular boxes symbolise program modules or algorithms for extracting certain features of the vehicle interior, for which existing and standardised image analysis libraries may be used.

Generally, a deep-learning network can be used for any feature of the vehicle interior to be detected. For the detection of persons, for example, a neural network may be trained that only recognises persons in the image, for the detection of objects a separate neural network, as well as for the detection of joint positions, eye positions, gaze directions, head positions, body postures, gestures, and so on.

In the course of the rough analysis, a person detection is carried out in step S101 and an object detection in step S201. The program modules each provide the positions of detected persons or objects in the three-dimensional space of the vehicle.

In the course of the first detailed analysis, in step S111, joint positions of each detected person are determined, in step S112, a unique identification number is assigned to each detected person, and in step S113, the sex and weight of each detected person are determined or estimated. At this hierarchy tier, a detection of partial objects is carried out for the detected objects in step S211 and an estimation of the weight of each detected object is carried out in step S212.

In the course of the second detailed analysis, in step S121, a segmentation of the eye portion of each detected person is performed, in step S122, the detection of hand gestures for each detected person is performed, and in step S123, a segmentation of the head portion of each detected person is performed. At this hierarchy tier, a sizing of partial objects is performed for the objects detected in step S221 as well as an estimation of the perimeter of each partial object detected in step S222.

In the course of the third detailed analysis, in step S131, a detection of the gaze direction of each detected person, in step S132, a detection of head poses for each detected person, and in step S133, a detection of emotions of each detected person.

The features of the vehicle interior extracted in the course of this data processing chain are stored in a database 9 (not shown), for example in the tree structure according to FIG. 3a. Two external program modules 17, 17' are indicated as oval-shaped blocks. Depending on their purpose, these obtain selected features of the vehicle interior from the hierarchical data model 9 or query these features directly from the respective program modules. In the concrete exemplary embodiment, a first external program module 17 requires the person IDs from the program module S112, the gaze direction of these persons from the program module S131, as well as the head posture of these persons from the program module S132 and, therefrom, determines a level of attention.

Regarding the detected objects, the external program module 17' requires the weight of the detected objects from the program module S212 and its size from the program module S221, and determines from this whether it is an object permissible for the interior of the vehicle in question. Again, the external program modules 17, 17' may be algorithms from standardised program libraries.

FIG. 3c shows a schematic section of a text file 22 for storing the data objects 21 of the hierarchical data model 9. The text file 22 is hierarchically structured and divided into logical blocks (persons, objects) as well as sub-blocks (eyes, head, body, gaze direction, etc.), wherein each block and sub-block may have a variety of attributes (for example, coordinates) that form a data object 21. This figure shows only a small part of the text file 22, which in practice may be much more extensive and also further refined during the operation of the method by including additional attributes. Such an implementation of the data model 9 allows a simple and fast query by external program modules 17, 17', which allows an easy-to-program and thus portable interface for data access to the detected features of the vehicle interior. The program modules 17, 17' thus do not have to analyse the photo 11 or the body and object images 15, 15', 15'', but directly retrieve the desired data from the text file 22.

For example, in this schematic section of the text file 22, it is evident that the detected features of the vehicle interior are arranged in hierarchical form. A distinction is made between the driver and the co-driver. In the example, there is a driver sitting in a certain position, this position being recognised in photo 11 (block "pose", "height": 1163, "width": 872, "x": 754, "y": −81). Additionally, joint positions and eye positions, for example, are assigned to the driver. For each detected head there is a pose ("headPose") and 3 associated angles ("ccsPitchDegree": 24.61, "ccsRollDegree": −15.06, "ccsYawDegree": 39.91). Also for the eyes, additional information is computed (in the example under "eyes", where an opening ("openness") or a gaze direction ("eyeGaze") is computed for each eye.

Figure 4:
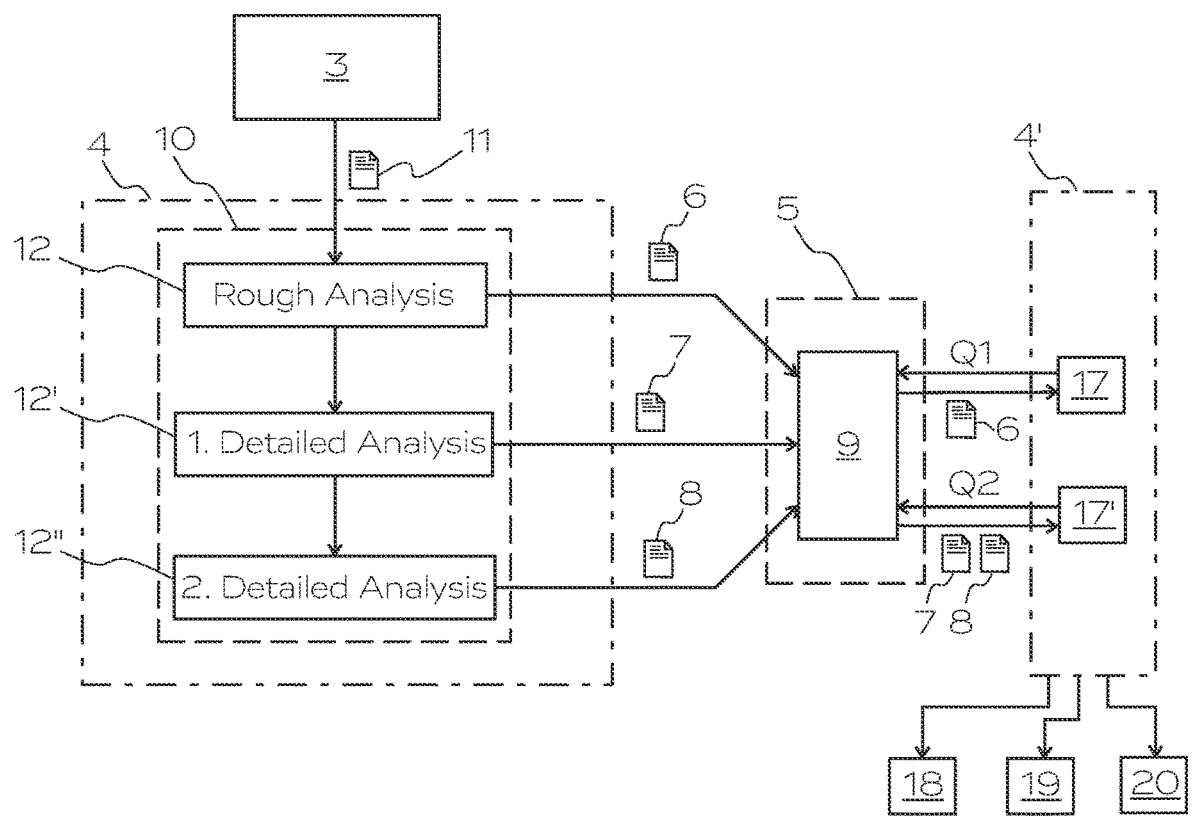
FIG. 4 shows a schematic block diagram of an embodiment of a device according to the invention.

FIG. 4 shows a schematic block diagram of an embodiment of a device according to the invention for determining features of the interior of a vehicle. The device comprises an image capturing unit 3, a data processing unit 4, a further data processing unit 4' and a database 5. All components are arranged in one vehicle. A sequential data processing chain 10 is implemented in the data processing unit 4, which in this embodiment comprises three program modules 12, 12', 12'' for analysing a photo 11 provided by the image capturing unit 3 via an interface. These program modules 12, 12', 12'' are divided into a rough analysis of the photo 11, a first detailed analysis of selected body images 15, 15', 15'' of the photo 11, and a second detailed analysis of selected face images 16, 16' of the body images 15, 15', 15''. The results of this hierarchical image analysis are the personal data 6, body data 7 and facial data 8 transmitted to the database 5 by the program modules 12, 12', 12''.

In the database 5, this extracted data is stored in a hierarchical data model 9. This data model 9 may be implemented in the form of a tree structure.

A hierarchical tree structure may be designed in such a way that personal data 6 and various body regions are assigned to a recognised person at the highest hierarchical tier (lowest level of detail). Various body data 7 and face images are assigned to the body regions on the middle hierarchy tier. Facial data 8 are assigned to the face images on the lowest hierarchy tier (highest level of detail).

Once the analysis of the photo 11 is complete, it may be discarded as all relevant data is stored in the hierarchical data model 9. Subsequently, internal or external program modules may access the data model 9 to extract the information they need to determine the desired characteristics of the interior.

For example, external program modules 17, 17' in an external data processing unit 4' may make queries Q1 and Q2 to the database 5, each containing the required hierarchy tier. Subsequently, the database provides the program modules 17, 17' with the required information of these hierarchy tiers.

In the present example, this is the personal data 6 for query Q1 (e.g. how many persons are sitting in the back seat?), or the body data 7 and facial data 8 for query Q2 (e.g. which are the gaze directions and body postures of the driver and passenger?). The data processing unit 4' is connected to an engine control system 18, a display unit 19 and a warning light 20 of the vehicle 1 to activate an actuator of the seat or an exterior mirror, to issue a warning on the dashboard, or to show information to the driver on a display, depending on the result of its queries Q1 and Q2.

The invention is not limited to the described exemplary embodiments, but also comprises further embodiments of the present invention within the scope of the following patent claims.

LIST OF REFERENCE SIGNS

1 Interior
2 Vehicle
3 Image capturing unit
4, 4' Data processing unit
5 Database
6 Personal data
7 Body and object data
8 Facial data
9 Hierarchical data model
10 Data processing chain
11 Photo
12, 12' Program module
13, 13', 13'' Body joint model
14, 14' Face model
15, 15', 15'' Body and object image
16, 16' Face image
17, 17' External program module
18 Engine control system
19 Display unit
20 Warning light
21 Data object
22 Text file

The invention claimed is:

1. A computer-implemented method for determining features of the interior of a vehicle with at least one image capturing unit, a data processing unit and a database, comprising the following steps:
   a. capturing, by the image capturing unit, a photo or video of the interior and transmitting it to the data processing unit,
   b. analysing of the photo or video, in the data processing unit, by a sequential data processing chain of hierarchically arranged program modules, comprising the steps of
      i. performing an analysis to localise persons and objects for generating body and object images,
   c. applying one or more image processing algorithms on the body and object images for extracting therefrom body and object data of the localised persons, the object data comprising at least one of:
      body height,
      body weight,
      age,
      sex,
      a body joint model,
      body posture,
      object size,
      object weight, and
      object colour,
   d. storing, by the data processing unit, of the determined body and object data in a hierarchical data model comprising data objects in the database, wherein the data objects of the hierarchical data model are stored in a hierarchically structured text file in the data processing unit, and e. using the hierarchical data model by external program modules to determine whether positions of the localised objects relative to the localised persons in the interior of the vehicle create one or more potential safety risks during vehicle operation; and
f. activating one or more warning units when the one or more potential safety risks are detected.

2. The method according to claim 1, wherein, in the context of the rough analysis, the data processing unit by applying image processing algorithms
   a. extracts the number of persons and the number of objects as well as their positions as person and object data, and
   b. detects an outline of the persons and objects in the photo and generates the body and object images around this outline.

3. The method according to claim 1, wherein an external program module for determining a feature of the interior of the vehicle extracts from the hierarchical data model the body and object data required for determining the feature.

4. The method according to claim 1, wherein the external program modules are part of an external data processing unit.

5. The method according to claim 1, wherein the feature of the interior of the vehicle is one or more of the following: occupancy of the vehicle, seat belts correctly fastened, position of objects relative to a person in the vehicle, level of attention or fatigue of the driver according to the driving situation.

6. The method according to claim 1, wherein actuators or warning units of the vehicle are controlled depending on the features of the interior of the vehicle.

7. A non-transitory computer-readable storage medium, comprising instructions which cause a data processing unit to perform a method according to claim 1.

8. A device for determining features of the interior of a vehicle, comprising at least one image capturing unit, a data processing unit and a database, characterised in that the device is designed for carrying out a method according to claim 1.

9. The device according to claim 8, characterised in that an external data processing unit is provided, which is connected to actuators or warning units of the vehicle.

10. The method according to claim 1, wherein the feature of the interior of the vehicle is one or more of the following: occupancy of the vehicle, seat belts correctly fastened, position of mobile phones or child seats relative to a person in the vehicle, level of attention or fatigue of the driver according to the driving situation.

11. The method according to claim 1, wherein an engine control system, a display unit or a warning light of the vehicle are controlled depending on the features of the interior of the vehicle.

12. The device according to claim 8, characterised in that an external data processing unit is provided, which is connected to an engine control system of the seats, a display unit or a warning light in the dashboard.

* * * * *